Figure 1:
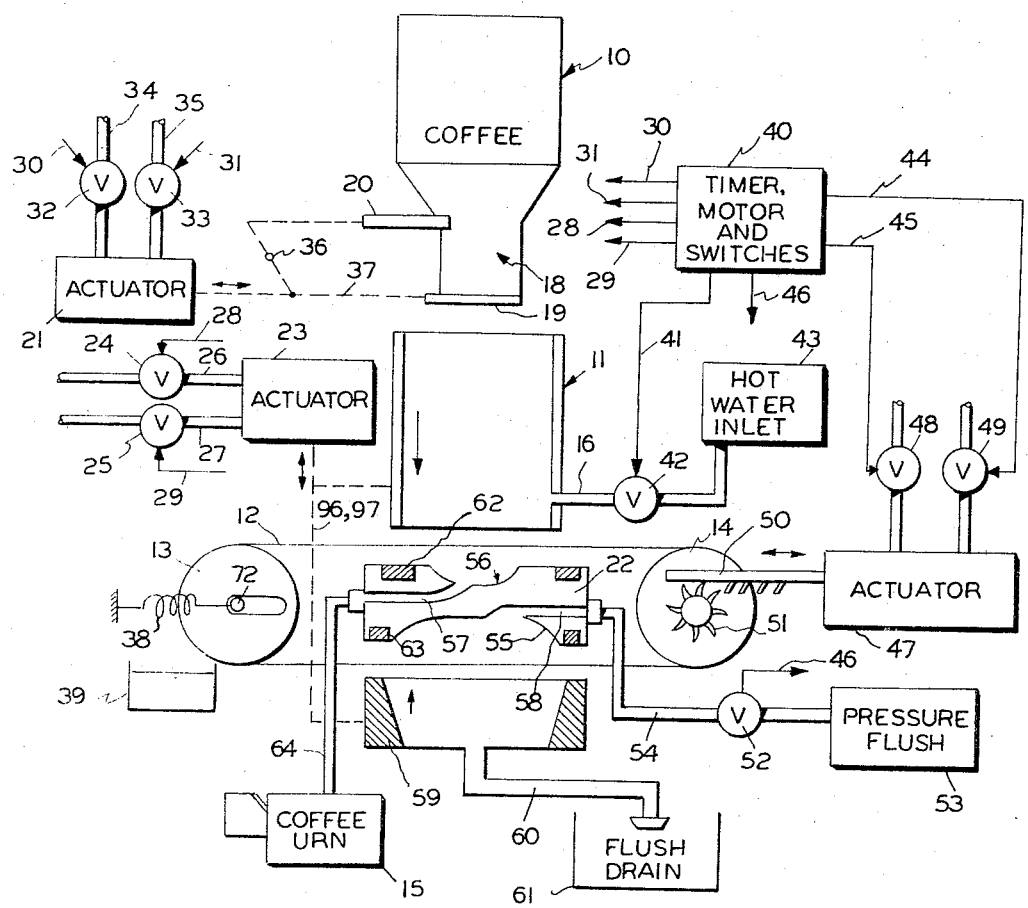

Feb. 28, 1967   S. E. RICHESON   3,306,183
BEVERAGE INFUSION MACHINE
Filed July 13, 1964
2 Sheets-Sheet 2

INVENTOR
SANFORD E. RICHESON

BY Paris, Haskell & Levine
ATTORNEYS

United States Patent Office 3,306,183
Patented Feb. 28, 1967

3,306,183
BEVERAGE INFUSION MACHINE
Sanford E. Richeson, Brooklyn, N.Y., assignor to
Alfred B. Levine, Chevy Chase, Md.
Filed July 13, 1964, Ser. No. 382,160
8 Claims. (Cl. 99—289)

This invention pertains to beverage infusion machines and is particularly concerned with machines for infusing and dispensing coffee or other beverage in a completely automatic manner and being capable of supplying the infused beverage at a very high capacity rate, or on demand, for use in restaurants, lunch counters, catering establishments and the like.

It is accordingly a principal object of the invention to provide such a machine that is considerably smaller in size, considerably less complex, and considerably less expensive than comparable machines of similar capacity.

A further object is to provide such a machine that is capable of producing the beverage very rapidly on demand, thereby eliminating the need for storing large quantities of prepared coffee for prolonged periods.

Still another object is to provide such a machine for dispensing coffee in units of moderately small quantity and capable of successively producing these quantities at a rapid rate to satisfy a large quantity demand.

A still further object is to provide such a machine that is less expensive in initial cost and less expensive to operate than machines of comparable capacity.

Still another object of the invention is to provide such a machine that is fully automatic and is self-cleaning in operation.

A further object of the invention is to provide such a machine employing a permanent filter for separating the beverage from the infused solids, and wherein the filter is automatically cleaned after each quantity of beverage is filtered.

A still further object is to provide such a machine using a less expensive filtering mechanism for each quantity of coffee produced.

Very generally according to the invention these improved functions are performed by a machine employing a single reciprocating infusion chamber in which the beverage ingredients are introduced and rapidly infused, together with an endless permanent filter belt that is engaged by the infusion chamber to filter the beverage and carry away the spent beverage ingredients. After filtering, the filter and chamber are separated from one another and the used filter portion is advanced to carry away the spent residue and to be cleaned by reverse flushing while concurrently a clean portion of the moving filter belt is positioned near the chamber in readiness to provide the next quantity of beverage. In this repeated manner each quantity of beverage is rapidly produced, and a series of such quantities may be produced at a substantially continuous rate, or intermittently, to supply a high capacity demand or a lower demand as might be desired.

In one preferred embodiment of the invention, the infusion chamber is provided as a lightweight and open-ended cylinder, and the filter is provided as an axially movable endless belt that is periodically engaged by reciprocating the cylinder against the filter during the making and filtering of the coffee, and is disengaged from the cylinder and advanced after each quantity of the coffee is made. The used portion of the filter belt is automatically cleaned concurrently during the next coffee infusion and filtering cycle.

Figure 2:
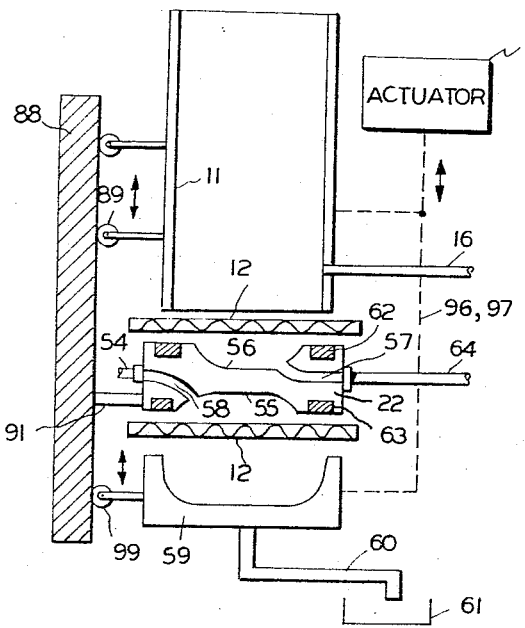
Figure 3:
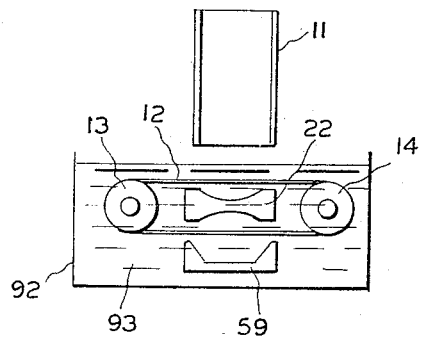
Figure 4:
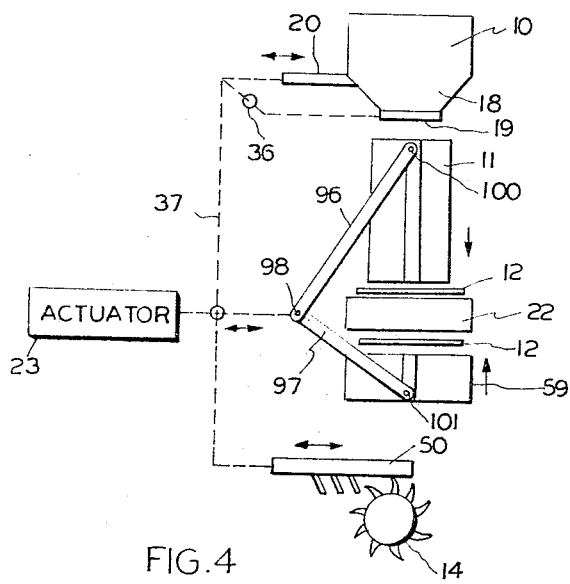

Other objects and many additional advantages of the invention will be more readily understood by those skilled in the art after a detailed consideration of the following specification taken with the accompanying drawings wherein:

FIG. 1 is a diagrammatic cross-sectional view of the machine taken from the front and schematically illustrating the automatic controls, FIG. 2 is a partial cross-sectional view taken from the side and illustrating one manner of supporting the moving parts on the frame, FIG. 3 is a view similar to FIG. 1 and illustrating the immersing of the filter belt and related parts in water when the machine is not in use, and FIG. 4 is a view taken from the rear and illustrating a preferred actuating mechanism and drive linkage.

Referring to FIG. 1 for a detailed consideration of a preferred embodiment of the invention and its mode of operation, the machine generally comprises a coffee hopper 10 for receiving and dispensing premeasured quantities of ground coffee, an infusion chamber in the form of an open-ended hollow cylinder 11 for receiving the charge of coffee and premeasured quantities of hot water, a stationary base member 22 for sealing the opening at the base of the infusion cylinder when the cylinder is lowered against the base 22, an endless permanent filter belt 12 supported on rollers 13 and 14 to be sandwiched between the infusion cylinder of 11 and the base 22 to filter the beverage from the infused ingredients, and a flush ring member 59 positioned below the base 22 for reverse flushing and cleaning the belt.

As best shown in both FIGS. 2 and 4, the infusion cylinder 11 and flush ring 59 are slidably mounted on an upright frame 88 and interconnected by levers 96 and 97 to be reciprocated in opposition by a water operated actuator 23. On the rearward stroke of the shaft of the reciprocating actuator 23, the infusion cylinder 11 is lowered by the lever 96 against the upper web of the endless filter belt 12 and in doing so urges the belt 12 downwardly and tightly against the stationary base 22, as shown in FIG. 1, permitting the infused coffee within the cylinder 11 to be filtered through the belt 12 and pass into the dish-shaped hollow 55 provided in the stationary block 22 and thence through the outlet 57 and coffee drain tube 64 to be received by the coffee urn 15 positioned at the base of the machine. Concurrently on this rearward stroke, the flushing ring member 59 is raised until it engages the lower web of the filter belt 12 and tightly sandwiches the lower web against the underside of the stationary block 22. In this position, a pressurized stream of flushing water from source 53 is admitted through an inlet 58 in the block 22 and thence passes through the lower dish-shaped opening 55 provided in the block 22 and through the mesh of the filter belt 12 to be collected by the flush ring 59 and conveyed in a suitable manner to the flush drain 61. It will be noted that the flushing water is forced through the underside of the filter belt 12 and in an opposite direction as when filtering coffee. Thus any small particles of ground coffee that have been previously entrapped in the mesh of the filter belt 12 are flushed out to the drain 61 to thoroughly clean and renew the filter 12 for subsequent operation.

Referring to FIG. 1, the automatic operation of the machine is controlled by a timer mechanism 40 that produces electrical signals at preset time intervals during each cycle of operation to selectively energize solenoid valves for performing the various functions. In the beginning of each cycle, the solenoid valves 24 and 25 are energized by the timer motor mechanism 40 to operate the actuator 23 for lowering the infusion cylinder 11 against the filter belt 12 and block 22, and raising the flush ring 59 against the underside of the belt 12 and block 22. As shown, the block 22 is provided on its upper surface with rubber or neoprene washer inserts 62 at the positions receiving pressure from the ends of the cylinder 11 thereby to provide a liquid tight seal, and is similarly provided with washers 63 on its lower surface to seal the portions receiving pressure from the flush ring 59.

After the infusion cylinder 11 has been lowered, the timing mechanism 40 energizes the valves 32 and 33 to operate the actuator 21 for enabling a premeasured quantity of ground coffee to be emptied from the coffee hopper 10 into the upper open end of the infusion cylinder 11, and the timer 40 also operates the solenoid valve 42 to admit hot water from the pressurized hot water inlet 43 over tube 16 and into the cylinder 11 near its base. The hot water is introduced into the mixing cylinder 11 with a swirling motion to thoroughly infuse the coffee and for a time interval sufficient to substantially fill the infusion cylinder 11. This infused coffee mix is continuously filtered through the filter belt 12 and flows downward to the coffee urn 15 as generally described above. A premeasured quantity of water is obtained by accurately timing the valve 42, or if desired, a flow control valve may be used to permit a premeasured quantity to pass into the cylinder 11.

The solenoid valve 52 is also energized at this time to admit cold pressurized water from the flush source 53 into the inlet 58 of the stationary block 22 where it is directed by the dish-shaped chamber 55 to reverse flush through the filter 12 forcing the entrapped residue through the flush ring 59 and drain tube 60 to the flush drain 61.

After a given time interval that is sufficient for filtering the coffee beverage, the timer mechanism 40 then operates the solenoid valves 24, 25 for controlling the actuator 23 to raise the cylinder 11 and flush ring 59 away from the filter belt 12. As these members are removed from the belt 12, the timer mechanism 40 then energizes the solenoid valves 48 and 49 to operate the actuator 47. Operation of the actuator 47 positions a ratchet arm 50 against teeth 51 on the drive roller 14 to rapidly rotate the drive roller 14 and thus rapidly advance the filter belt 12 for one half of a complete revolution.

The drive roller 14 is rotated sufficiently to position the used portion of the filter belt 12 around the idler roller 13 and into a position directly above the flush ring 59. As the filter belt 12 passes over the idler roller 13, it empties the spent coffee grounds and other residue which have remained on the surface of the belt 12 into a residue collection container 39 positioned below the idler roller 13 as shown. This removes most of the spent residue on the filter belt 12. It is noted that when the drive roller 14 has completed the positioning of the filter belt, the previously used portion of the filter is positioned directly above the flush ring 59 and in readiness for being cleaned during the next coffee making cycle, and a fresh filter belt portion is positioned below the infusion chamber 11 for filtering the next quantity of infused beverage.

The advance of the used portion of the filter belt 12 from a position above the upper surface of the support block 22 to an opposite position below the lower surface of the block is controlled to occur very rapidly for quickly preparing the machine in readiness for the next quantity of coffee.

Thus during the coffee making cycle, the infusion cylinder 11 and flush ring 59 are concurrently positioned against opposite sides of the filter belt 12 and block 22. The coffee making ingredients are then introduced into the cylinder 11 and filtered through the belt 12, while concurrently, the opposite portion of the filter belt 12 underneath the stationary block 22 is reverse flushed by a pressurized stream of water to thoroughly clean it and prepare it for the next cycle of operation. It will be appreciated by those skilled in this art that the infusion and filtering of the coffee beverage will require a considerably longer time interval than the high pressure reverse flushing of the filter which can be performed very rapidly. However, by performing both of these operations together, the pressures on the opposite side of the block 22 are substantially equalized permitting the block 22 and its support structure to be made smaller, lighter in weight, and less expensive than would otherwise be required.

As shown in the drawings, the hopper 10, mixing cylinder 11, stationary support 22, the flush ring 59 are all preferably positioned in a vertical linear array that provides a compact and easily assembled structure, and also provides the advantage of gravity feed and drain of the coffee ingredients and filtered beverage. Since only moderate quantities of coffee are produced during each cycle of operations, the individual parts are made small and lightweight requiring but small size and low torque actuators 21, 23, and 47.

Although the permanent filter belt 12 has a relatively long life cycle due to the fact that it is pressure cleaned after each use, it is necessary to periodically replace it when it becomes worn or eventually soiled. This is performed by slidably supporting the hub of idler roller 13 in a horizontal slideway 72 for movement toward and away from drive roller 14. To maintain tension on the filter belt 12, a spring return 38 is provided against the idler roller 13 hub as shown; and for replacing the filter belt 12 it is necessary only to disengage the spring 38 and displace the idler roller 13 toward the drive roller 14 permitting the belt 12 to be easily withdrawn or replaced. Alternatively, the idler roller 13 may be moved toward the drive roller 14 against the spring tension and held in this position while the belt is removed from the rollers and replaced by a new filter.

To provide for thorough cleaning of the machine at the end of each day so as to remove any residue, coffee oils, or acids that may have accumulated, the mixing and infusion chamber 11 is detachably mounted (not shown) on its slideway in a manner permitting its removal for separate cleaning. Additionally, as shown in FIG. 3, the filter belt 12, rollers 13, 14, stationary support block 22, and flush ring 59 are also so mounted with respect to a rear frame 8 that they may be completely immersed in a pan 92 filled with water 93 without removing these parts from the machine. Thus at the end of each day or at other time when the machine is not in use, an operator need only insert the pan 92 into the machine and about these parts, and fill it with hot or cold clean water 93, whereby all of these operating parts are immersed in and soak in clean water overnight to keep the parts fresh and ready for use the following day.

For periodically cleaning the beverage dispensing hose 64 and related parts, the machine may be cycled with only hot water and without introducing coffee into the mixing cylinder 11. This is easily performed by temporarily disconnecting the electrical lines 30 and 31 interconnecting the valves 32 and 33 with the timer mechanism 40, or alternatively disconnecting the slides 19 and 20. In this manner, when the timer mechanism 40 is cycled, only hot water is introduced in the cylinder 11 and passes through the filter 12, block 22 and hose 64 to the coffee urn 15.

The manner of premeasuring the correct quantity of coffee grounds being introduced during each coffee making cycle is performed by providing a measuring container 18 at the base of the coffee hopper 10 together with a pair of slides 19 and 20 to alternately close the top and bottom of the measuring container 18. With the slide 19 being closed and slide 20 open, as shown in FIG. 1, the ground coffee from the hopper 10 fills the container 18 with a preset quantity; and for dispensing this quantity, the actuator 21 is energized to close the slide 20 and open the slide 19 by means of a suitable linkage indicated by dotted lines 37.

If it is desired to adjust the amount of coffee produced during each cycle, additional slides (not shown), such as 20, may be provided at different distances above the base slide 19 in the measuring container 18 and selectively connected to the actuator linkage 37. The quantity of hot water introduced into the mixing cylinder 11 can be similarly controlled by adjusting the timer mechanism 40 to close the hot water valve 42 for a longer or shorter time interval, as desired, or alternatively an adjustable flow control valve 42 may be employed to pass premeasured quantities of water.

As is known to those skilled in the art, the timing motor mechanism 40 and the solenoid operated valves are commercially available components that are commonly sold on the open market by a number of different manufacturers. Further details of these components are also disclosed in the earlier patent of the same inventor, No. 2,827,845, and therefore need not be repeated in any great detail in this specification. In a preferred and inexpensive construction, the timing mehcanism 40 employs a low power "Telechron" timer motor for rotating a series of timing cams (not shown), each cam operating an electrical switch at a preset time interval during each cycle of rotation of the motor. These electrical switches selectively energize the electrical lines 28, 29, 30, 31, and 46 to operate the solenoid controlled valves, such as valves 24 and 25 discussed above.

The hydraulic actuators, such as unit 23 discussed above in FIG. 1, are also well known and commercially available water driven slides or water operated motors that employ a piston within a closed cylinder for reciprocating a shaft, and being provided with four-way inlet and outlet valves for applying water pressure on opposite sides of the piston to reciprocate the shaft. In the preferred construction of the machine shown in FIG. 4, only one such actuator 23 is needed together with drive linkages to control all of the mechanical movements of the machine. As shown in FIG. 4, the reciprocating shaft of this actuator 23 is interconnected with the mixing cylinder 11 and flush ring 59 by means of pivotal levers 96 and 97, and is additionally connected with the slides 19 and 20 of the coffee measuring container 18 by a suitable linkage 37, and is also connected with the ratchet arm 50 to rotate the filter belt drive roller 14.

At the beginning of each coffee making cycle the actuator shaft is positioned to the left and thereby simultaneously lowers the cylinder 11 and raises the flush ring 59 against opposite sides of the filter belt 12 and block 22. Concurrently, this same movement of the shaft pivots the linkage 37 to open the slide 19 and close slide 20, thereby emptying the coffee from the measuring container 18 into the infusion cylinder 11. In addition, this same shaft movement withdraws the ratchet drive arm 50 to the left away from the drive roller 14.

When the coffee filtering interval has been completed, the timer 40 energizes the actuator 23 to position its shaft to the right. This movement raises the cylinder 11 and flush ring 59 away from the filter 12 and concurrently drives the ratchet arm 50 to the right for rotating the drive roller 14 and advancing the filter belt. Additionally, it pivots the linkage 37 to close the slide 19 and open the slide 20 enabling the coffee measuring container 18 to fill with ground coffee from the hopper in preparation for the next coffee making cycle.

In a preferred embodiment of the machine which is adapted for use at lunch counters, restaurants and catering establishments, the machine is far smaller in size, lighter in weight, and considerably less expensive and complex in both initial cost and operation than machines of the prior art. Yet the machine is capable of rapidly and automatically producing quantities of freshly infused and dispensed coffee in sufficient volume to serve large numbers of users. For example, a machine constructed according to the invention for repeatedly producing coffee beverage in half gallon quantities every four minutes employs an infusion cylinder 11 of only four inches in diameter and eight inches in length (providing a container of two quart capacity) together with a double thickness cloth filter belt 12 of only 5 to 6 inches in width. Most of this four minute interval required for producing the beverage is occupied in the time for filtering the half gallon of infused finely ground coffee through the filter belt section 12. Since the filter is automatically cleaned under pressure after each half gallon quantity of beverage is produced, the timer mechanism 40 may be energized to cycle continuously, and repeatedly produce these half gallon quantities at a very rapid rate to supply many gallons of coffee in the matter of minutes, with each half gallon quantity being filtered through a freshly flushed filter belt portion.

It is also noted that the machine may be installed in any restaurant or other place having a supply of hot and cold water under pressure and an electrical outlet. Since the single actuator 23 is water pressure operated, the machine requires only minute quantities of electrical power as necessary to drive a low power "Telechron" type timing motor. It will also be evident that in the event that sufficient hot water or water pressure is not available, these may be supplied by incorporating a suitable water heater and/or water pump in the machine together with a commercially available type of temperature control thermostat and/or a pressure regulating valve as may be necessary to provide these functions.

To provide the small size, lightweight, and inexpensive construction desired, all of the parts are preferably constructed of plastic materials, aluminum, and stainless steel. Thus the frame 88 and the stationary support block 22 are formed of cast or machined aluminum, as in the flush ring 59. The mixing cylinder 11 is also made of a stainless steel cylinder providing the necessary strength and other advantages desired. The various tubings and drains are preferably made of plastic materials, as may be the overall outer case (not shown), to resist the coffee acids and oils; and the hoses are detachably connected by suitable hydraulic fittings to permit complete disassembly for cleaning or replacement of these parts as may be necessary after extensive periods of use.

It will be recognized that for purposes of simplifying the illustration of the machine, the reciprocating infusion cylinder 11 and flush ring 59 are shown in FIG. 2 as being slidably mounted on rollers 89 and 99 over the upright frame member 88. In the preferred construction, however, these members are fastened to slides that are mounted in guideways provided in a vertical mounting plate 88, and the slides are, in turn, connected to pivotal levers 96 and 97 as indicated in FIG. 4.

For fully automatic operation of the machine to supply a high quantity demand, a predetermined volume of beverage may always be maintained in the supply urn 15 or in a series of urns by providing electrical detecting probes (not shown) in the urns to measure the level of coffee; and by means of relays (not shown) to automatically energize the timing motor mechanism 40 to commence the next cycle of operation whenever the level of the coffee beverage falls below a preset quantity. In this manner the machine is cycled automatically to always maintain a desired quantity of prepared coffee. This additional form of automatic control of the machine operation is disclosed in applicant's prior Patent No. 2,827,845.

Although but one preferred embodiment of the invention has been described and illustrated, it is believed evident to those skilled in the art that many variations and changes may be made without departing from the spirit and scope of this invention. Accordingly, this invention is to be considered as being limited only by the following claims appended hereto.

What is claimed is:

1. In an automatic coffee infusion and dispensing machine, a reciprocally movable mixing chamber for receiving the coffee making ingredients, a base member, a movable and reuseable filter web, and a reciprocally movable flush member aligned with the mixing chamber transversely to the filter web and reciprocally movable in opposition thereto, a flush member, the same portion of said filter web being sandwiched between said mixing chamber and base member for filtering the coffee during one coffee making cycle and being sandwiched between said base member and flush member during a succeeding coffee making cycle to clean the filter, and timing means for positioning said web during said first and succeeding cycle.

2. In an automatic coffee making machine, an infusion chamber for receiving the coffee making ingredients, a stationary base member disposed below the chamber, a flush member disposed beneath said stationary base member, and a filter belt having a first portion disposed between the infusion chamber and base member and a second portion disposed between the base member and flush member, actuator means for positioning said infusion chamber against said filter to sandwich said first filter portion against the base member and concurrently positioning said flush member against said filter to sandwich said second filter portion between said flush member and the underside of said base member, and means associated with said base member and flush member to reverse flush and clean said filter when it is sandwiched between said stationary base member and said flushing member.

3. In the machine of claim 2, said filter belt comprising an endless web encircling said base member, and actuator means for advancing said web to reverse the positions occupied by said first and second portions.

4. In an automatic coffee making machine, a support structure, a stationary member rigidly mounted on the support structure, a hollow cylinder disposed for a reciprocal movement on such support structure toward and away from one side of said stationary member, a flushing member reciprocally disposed on such support structure for movement toward and away from the other side of said stationary member, a filter web disposed between said cylinder and one side of said stationary member and between said flushing member and the other side of such stationary member, actuating means for moving said cylinder to sandwich said filter web against one side of said stationary member and for moving said flushing member to sandwich said filter against said other side of said stationary member, means for moving said filter web, and means associated with said stationary member at said one side for conveying a filtered beverage therefrom and means associated with said stationary member at said other side for conveying a flushing fluid therethrough.

5. In an automatic coffee infusion and dispensing machine, a stationary member provided with an upper and lower chamber, a filter web having a portion proximate the upper chamber and a second portion proximate the lower chamber, a coffee infusion container positionable to sandwich said filter web portion against the upper chamber, a flush member positionable to sandwich said filter web second portion against the lower chamber, and actuated means for positioning said container and flush member in unison thereby to substantially equalize the pressure on said stationary member.

6. In an automatic coffee machine, an endless filter web, an infusion cylinder positionable against the web, a flush member positionable against a different position of the web, means for admitting coffee making ingredients into the cylinder to be filtered by the web, means for admitting flush water through said web and flush member to clean the web, actuator means for simultaneously positioning said cylinder and flush member against different portions of the web and providing axially aligned forces against the web in opposition to one another and advancing the web to provide different positions thereof in position to be engaged by said cylinder and flush member.

7. In the machine of claim 6, said actuator means comprising a single actuator unit and coupling means for advancing said web when said cylinder and flush member are not positioned against the web.

8. In an automatic coffee infusion machine, a reciprocally mounted cylinder for receiving the coffee making ingredients, an endless filter web engageable by the cylinder to filter the beverage, a reciprocally mounted flush member for enabling the cleaning of the web and positionable against the web, an actuator mechanism for jointly reciprocating said cylinder and flush member, a drive roller for advancing said endless filter web, a coffee dispenser for supplying ground coffee into the cylinder, and means interconnecting said actuator mechanism to sequentially operate said coffee dispenser, said cylinder and flush member, and said drive roller.

References Cited by the Examiner

UNITED STATES PATENTS

| | | | |
|---|---|---|---|
| 1,850,082 | 3/1932 | Medin | 99—289 X |
| 3,095,800 | 7/1963 | Gilbert | 99—289 |

FOREIGN PATENTS

| | | |
|---|---|---|
| 542,825 | 5/1922 | France. |
| 1,319,958 | 1/1963 | France. |
| 940,201 | 10/1963 | Great Britain. |

WALTER A. SCHEEL, *Primary Examiner.*

S. P. FISHER, *Assistant Examiner.*